United States Patent [19]
Bonnet

[11] Patent Number: 5,950,798
[45] Date of Patent: Sep. 14, 1999

[54] AIR DISTRIBUTION SYSTEMS FOR SHOE SORTER

[75] Inventor: Henri Bonnet, Atlanta, Ga.

[73] Assignee: United Parcel Services of America, Atlanta, Ga.

[21] Appl. No.: 08/806,445

[22] Filed: Feb. 26, 1997

[51] Int. Cl.[6] .................................................. B65G 47/46
[52] U.S. Cl. ...................................................... 198/370.02
[58] Field of Search ......................... 198/370.02, 370.07, 198/803.5

[56] References Cited

U.S. PATENT DOCUMENTS

| | | | |
|---|---|---|---|
| 2,293,121 | 8/1942 | Dudley, Jr. . | |
| 3,231,068 | 1/1966 | Harrison et al. | 198/370.06 |
| 3,333,675 | 8/1967 | Lord | 198/370.02 |
| 3,349,893 | 10/1967 | Jordan et al. . | |
| 4,170,281 | 10/1979 | Lapeyre . | |
| 4,711,341 | 12/1987 | Yu et al. | 198/370.02 |
| 4,732,260 | 3/1988 | Canziani . | |
| 4,884,676 | 12/1989 | Suizu | 198/370.06 |
| 4,930,613 | 6/1990 | Okura et al. | 198/370.06 |
| 5,127,510 | 7/1992 | Cotter . | |
| 5,823,320 | 10/1998 | Seidel et al. | 198/803.5 |
| 5,868,239 | 2/1999 | Bonnet | 198/370.02 |
| 5,890,584 | 4/1999 | Bonnet | 198/370.02 |
| 5,894,918 | 4/1999 | Bonnet | 198/370.02 X |

FOREIGN PATENT DOCUMENTS

| | | |
|---|---|---|
| 0 286 080 | 4/1988 | European Pat. Off. . |
| 0 391 301 | 4/1990 | European Pat. Off. . |
| 2 174 667 | 5/1986 | United Kingdom . |

*Primary Examiner*—Christopher P. Ellis
*Assistant Examiner*—Thuy V. Tran
*Attorney, Agent, or Firm*—Jones & Askew

[57] ABSTRACT

A package conveying system including an on-conveyor pushing assembly powered by an off-conveyor power source, with a "floating" power connection interface synchronized with the conveyor. This floating power connection interface can be provided by an endless air-filled "inner tube" having air ports thereon, can be provided by an endless belt having air-supplying nozzles thereon supplied with air from corresponding air supply tubes, or can be supplied by use of an endless belt having electrical contacts thereon.

32 Claims, 8 Drawing Sheets

AIR DISTRIBUTION SYSTEMS FOR SHOE SORTER

TECHNICAL FIELD

This invention relates generally to automated conveying and sorting of items such as packages from one or more loading sites to a variety of output destinations, and more particularly relates to a conveying system which includes a discharge station which provides a "floating" power connection to provide power to on-conveyor drive systems from an off-conveyor power source.

BACKGROUND OF THE INVENTION

In modern high volume package delivery systems, a variety of material handling systems are often used. Such material handling systems often include package conveying systems that divert packages placed thereon to a variety of output destinations such as chutes, bins, and subsequent conveyor systems.

Systems for diverting objects from a moving conveyor have been available for many years. Such systems are useful in discharging objects from a conveying surface at selected stations located along the path of the conveying surface.

Typical package diverting systems utilize a pusher element mounted relative to a conveying surface which when actuated ejects an adjacently placed package laterally across the conveyor surface to the desired discharge station. Many such systems guide the pusher element laterally across the conveying surface using a complex series of guide tracks or cams mounted beneath the conveying surface. Such systems would appear to be noisy and relatively difficult to repair. Additionally, the speed with which such systems eject parcels from the conveying surface is typically related to and restricted by the speed of the conveying surface.

The amount of "down time" a conveying system or sorting system is shut down for repairs and/or maintenance significantly impacts operating efficiency. Thus, reliability and ease of repair are major requirements. Reliability can be increased and down time reduced by constructing package conveying and sorting systems where mechanical assemblies may be quickly and easily removed and replaced without the use of tools. Such construction may be accomplished by use of detachable mechanical assemblies such as package diverters or by mounting mechanical assemblies on modular conveying systems such that the failed mechanical assemblies or the conveyor sections housing the failed assemblies may be quickly removed and replaced. Furthermore, because of the increased speeds required of modern package handling systems, reduction of noise levels is also a major requirement.

In U.S. Pat. No. 4,170,281 to Lapeyre, a modular conveyor belt is provided from extruded flexible links which may be either plastic or metal having ends joinable into an endless belt by an extruded substantially rigid joining member.

In U.S. Pat. No. 3,349,893 to Jordan, a segmented conveyor belt is disclosed having rigid plate sections that are joined together by flexible arch joining members. The joining members include marginal beads that are inserted into retainer grooves formed into the plates transverse to the direction of travel of the conveyor belt. Adjoining members are made of elastic, flexible materials such as rubber.

The modular diverter shoe and slat construction disclosed in U.S. Pat. No. 5,127,510 to Cotter describes a modular diverter shoe for use in a slat conveyor. A diverter shoe is mounted to each slat so that the shoe may glide across the slat. The movement of the diverter shoe is affected by a guide pin and coaxial bearing which engages a network of guide tracks located beneath the conveying surface. When a package is to be diverted, a diverting switch is actuated to switch the guide pins for the diverter shoe adjacent to the package onto a diagonal track, which causes the diverter shoe to move across the slat and eject the package.

Another apparatus for sorting objects is disclosed in U.S. Pat. No. 4,732,260 to Canziani. In that system, a conveyor belt is described in which each conveyor element has a slit. The pusher elements are slidably inserted into the slits and each pusher element is connected to a drive element that extends beneath the conveyor surface. The drive element is attached to rollers and interacts with a series of cams or guide rails located beneath the conveyor. The cams include an electro-pneumatic two-position end portion. In one position, the cam engages the drive element rollers and slides the pusher element. In a second position, the rollers do not engage the guide rails.

In some of the systems noted above, pusher elements are guided across an underlying conveying surface by interacting with a series of cams, guide rails or guide tracks located beneath the conveyor surface. It would appear that the action of the components of the moving pusher element against some of the underlying cams, guide rails and guide tracks would be a source of wear and noise. Upon failure of the underlying cams or guide components, it would appear that some of those prior art systems could undergo time consuming repair with resulting downtime for the conveying system.

Other problems associated with prior sorting systems could include the inability to eject objects from the moving conveying system at ejection speeds which are independent of the speed of the moving conveyor system. Other limitations in the prior art include limitations on the ability to eject a wide range of sizes and shapes of packages and the ability to manipulate the positioning of the object on the conveying surface prior to ejection.

As may be seen from the foregoing, prior sorting systems tend to be complex and require significant maintenance upon failure. Moreover, because such systems employ the interaction of rollers, cams and guide rails, such systems would appear to be noisy. Therefore, there has been a need in the art for a sorting system that is simple in construction, which can be easily maintained by removal and replacement of modular sortation assemblies, or conveyor sections housing sortation assemblies, without the use of tools, and which can sort and manipulate a wide range of objects at varying speeds and at relatively low noise levels.

Finally, the prior art does not provide an effective means for transferring power through a "floating" connection suitable for providing power from a single, stationary source to a plurality of moving conveyer systems.

SUMMARY OF THE INVENTION

The present invention overcomes deficiencies in the prior art by providing a conveying system which includes an "on-board" motor means driven by an off-conveyor source with energy to the motor transferred to each motor via a "moving" synchronized coupling, which provides reliable contact. This type of contact may be used to provide power transfer for both air and electrically powered motors or other power conversion means. Such an arrangement can allow for precise control of translator shoes configured for sideward, transverse movement of packages upon the conveyor or can allow for other controlled movements. The arrangement likewise allows for the provision of a "quick-change" conveyor section which minimizes downtime.

Generally described, the present invention relates to a conveyor apparatus comprising a stationary frame, a conveyor moving about an endless path configured to carry packages along the endless path, a plurality of lateral urging apparatuses attached to the conveyor, a discharge station configuration to provide power to at least one of the lateral urging apparatuses through a power supply interface which is synchronized to the conveyor.

It is a further object of the present invention to provide a conveyor apparatus defining at least one package supporting surface for conveying a package placed thereon along a conveyor path and selectively urging the package laterally from the conveyor path with the aid of an off-conveyor power source, the apparatus comprising a stationary frame, a package conveying portion movable relative to the frame for defining the supporting surface, a lateral urging assembly including a first power interface member movable along a first path, the lateral urging subapparatus attached relative to the package conveying portion for moving therewith and for selectively urging the package laterally to the conveyor path upon the supply of power to the first power interface member, a stationary power supply station including a second power interface member operably attached relative to the off-conveyor power source and movable along a second path, the second path positioned relative to the first path to allow the first and second power interface members to be both engaged and disengaged as they move along the respective paths, and means for synchronizing the movement of the first and second power interface members such that they can go from being disengaged to engaged to disengaged while the package conveying portion is moving relative to the frame, such that the lateral urging assembly can be selectively energized via power from the off-conveyor power source when the first and second power interface members are engaged.

The present invention further provides a conveyor apparatus defining at least one package supporting surface for conveying a package placed thereon along a conveyor path and selectively urging the package laterally from the conveyor path with the aid of an off-conveyor power source, the apparatus comprising a stationary frame, a package conveying portion movable relative to the frame for defining the supporting surface, a lateral urging assembly including a first power interface member movable along a first path, the lateral urging subapparatus attached relative to the package conveying member for moving therewith and for selectively urging the package laterally to the conveyor path upon the supply of energy to the first power interface member, a stationary power supply station including a flexible endless belt and a second power interface member operably attached to the flexible endless belt, the flexible endless belt movable such that the second power interface member is movable along a second path, the second path positioned relative to the first path to allow the first and second power interface members to be both engaged and disengaged as they move along the respective paths, and means for synchronizing the movement of the conveyor and the flexible endless belt such that the first and second power interface members go from being disengaged to engaged to disengaged while the package conveying portion is moving relative to the frame, such that the lateral urging subapparatus can be selectively energized via power from the off-conveyor power source when the first and second power interface members are engaged.

Finally, the present invention provides a conveyor apparatus defining at least one package supporting surface for conveying a package placed thereon along a conveyor path and selectively urging the package laterally from the conveyor path with the aid of an off-conveyor power source, the apparatus comprising a stationary frame, a package conveying portion movable relative to the frame for defining the supporting surface, a lateral urging subapparatus including a first power interface member movable along a first path, the lateral urging subapparatus attached relative to the package conveying member for moving therewith and for selectively urging the package laterally to the conveyor path upon the supply of energy to the first power interface member, a stationary power supply station including a flexible endless tube and a second power interface member operably attached to the flexible endless tube, the flexible endless tube movable such that the second power interface member is movable along a second path, the second path positioned relative to the first path to allow the first and second power interface members to be both engaged and disengaged as they move along the respective paths, and means for synchronizing the movement of the conveyor and the flexible endless tube such that the first and second power interface members go from being disengaged to engaged to disengaged while the package conveying portion is moving relative to the frame, such that the lateral urging subapparatus can be selectively energized via power from the off-conveyor power source when the first and second power interface members are engaged.

Therefore, it is an object of the present invention to provide an improved automated conveyor sorting system.

It is a further object of the present invention to provide a conveyor which includes improved discharge capabilities.

It is a further object of the present invention to provide a conveyor which operates at reduced noise levels.

It is a further object of the present invention to provide a conveyor which is safe to operate.

It is a further object of the present invention to provide an improved conveyor which may be easily dismantled for repair and maintenance.

It is a further object of the present invention to provide an improved ejection mechanism for ejecting items from a conveying surface.

It is a further object of the present invention to provide an improved apparatus for conveying and sorting items that can be repaired by quickly removing failed sub-assemblies.

It is a further object of the present invention to provide a conveyor which is simple in construction.

It is a further object of the present invention to provide a conveyor which is simple in operation.

It is a further object of the present invention to provide a conveyor which is cost-effective to manufacture.

It is a further object of the present invention to provide a conveyor which is cost-effective to operate.

It is a further object of the present invention to provide a conveyor which is cost-effective to maintain.

It is a further object of the present invention to provide a conveyor which is reliable in operation.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Reference is now made to the figures, in which like numerals represent like elements throughout the written description.

Overview

Generally described, the present invention relates to the provision of a package conveyor which operates in conjunction with a discharge station, with the discharge station providing power to the conveyor sufficient to discharge packages laterally from the conveyor by means of lateral translation assemblies which can take various forms. Moving parts on the stationary discharge station are synchronized with the conveyor such that a plurality of intermittent, "floating", power connections or "power interfaces" are provided between the discharge station and the conveyor. These connections allow for power to be transferred from a substantially stationary off-conveyor source to the lateral translation assemblies moving along with the conveyor.

The "floating" power connections can be electrical, air, or other means known in the art. In the case of an air connection, a plurality of air-supplying "nozzles" are provided to move on an endless track. Each nozzle is supplied with air and is configured for synchronous engagement with a suitable receptacle on an air motor which is attached to the conveyor. Air supplied to the air motors can provide sufficient power to provide a pushing motion sufficient to discharge packages sidewardly, even as the conveyor is moving. Air is supplied to the nozzles through means such as an "inner tube" or a number of individual air supply tubes attached to a common air supply housing. The air supply to each nozzle is controlled by air valves themselves controlled by, for example, a programmable logic controller, which allows for improved control of the transverse movement of translator shoes attached to the conveyor.

In the case of a floating electrical connection, a pair of exposed electrical connections are provided in place of each of the nozzles and receptacles. Again, the electrical current supply to each nozzle is controlled by a programmable logic controller.

The lateral translation assemblies can take the form of a translator shoe slidably mounted on the conveyor and driven by an endless belt or a lead screw, either of which can be driven by an air or electric motor. Horizontal or vertical bellows may also be used to provide a pushing or tilting action, respectively.

First Embodiment

Figure 1:
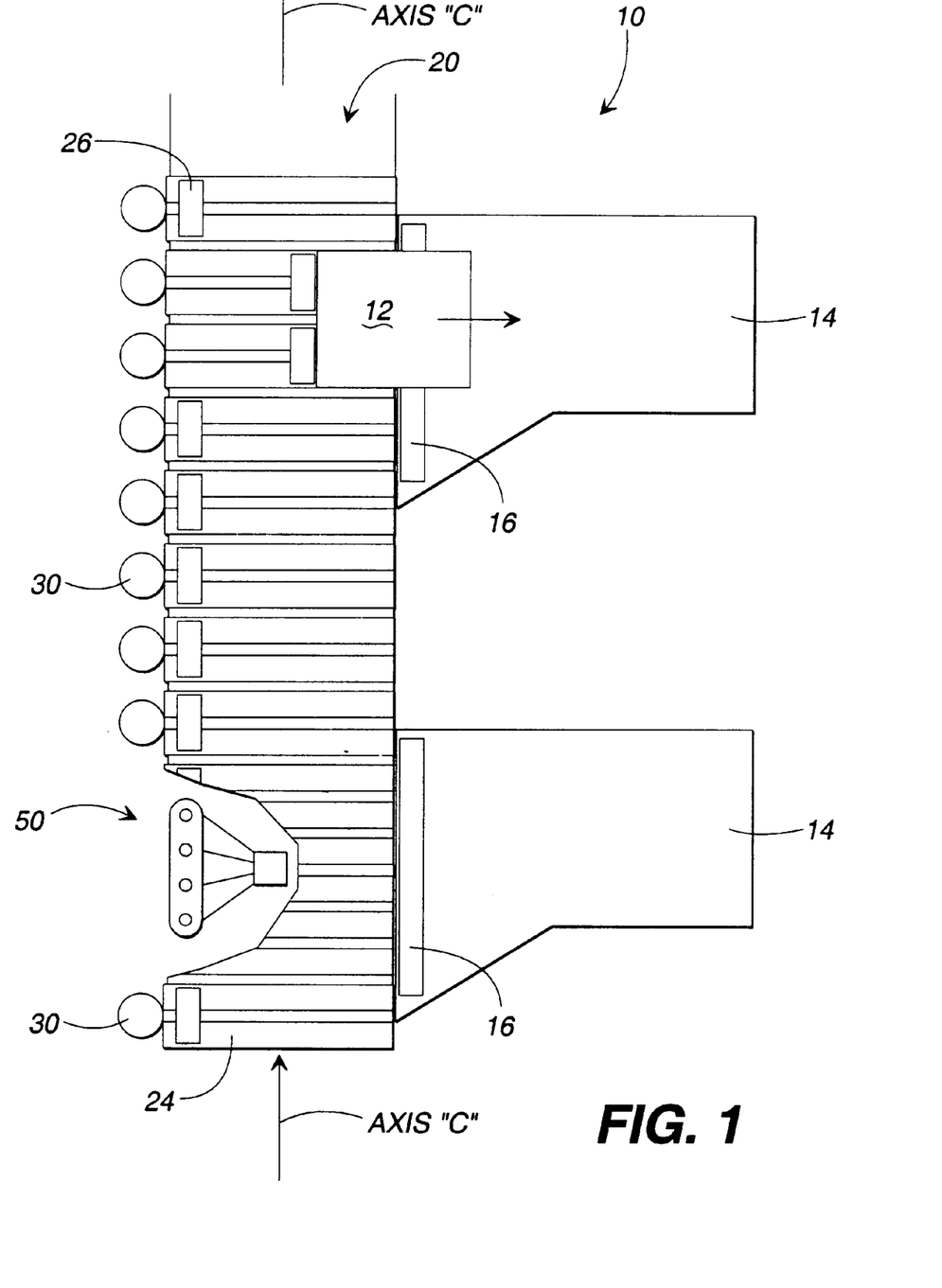
FIG. 1 is a top view of a conveyor system 10 according to the present invention used in conjunction with a discharge station according to the present invention. No retractors are shown.

Referring now first to FIG. 1, packages 12 are discharged from atop a conveyor 20 by the use of a plurality of lateral urging assemblies 23 (also known as "pusher assemblies"), each of which includes at least one translator shoe 26 (which may also be referred to as a "pusher plate"). The translator shoes 26 are configured to push packages positioned atop the upwardly-directed surface of the conveyor 20 off of the conveyor in a direction generally transverse to the travel axis of the conveyor axis, which is generally up-and-down as viewed in FIG. 1, and substantially normal to the drawing plane of FIG. 2.

Figure 2:
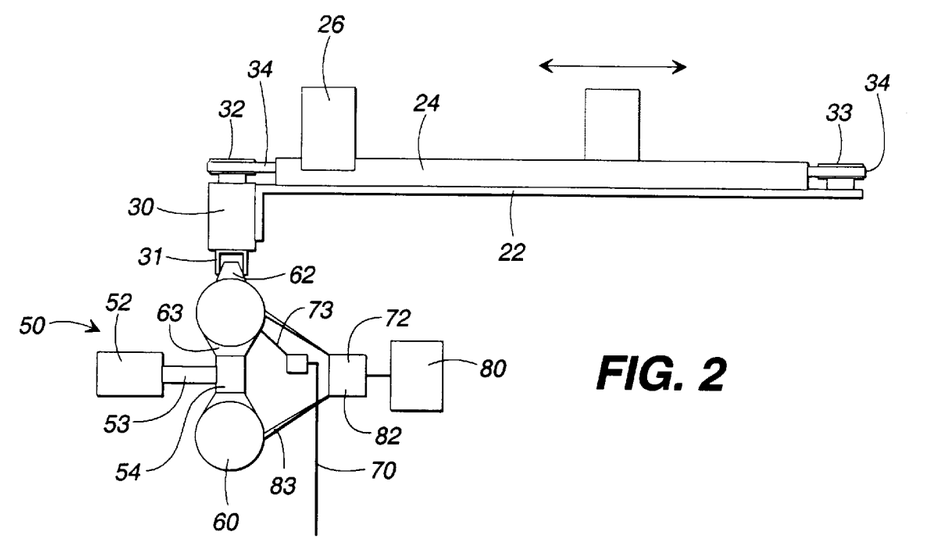
FIG. 2 is a side cross sectional view of the conveyor system 10 according to the present invention viewed along the conveying axis. No retractor is shown.

The discharge stations, generally denoted as 50 in FIGS. 1 and 2, are positioned under one edge of the conveyor 20, and are configured to cause selected movement of the translator shoes 26 when they are in the vicinity of the discharge station 50. Each discharge station 50 has a corresponding discharge chute 14 configured to receive the packages 12 as they are pushed laterally from the conveyor 20. An elongate exit roller 16 (See FIG. 1 only) is provided at the mouth of each discharge chute to facilitate movement of the packages into the discharge chute 14. The exit roller 16 is rotatably mounted about an axis which is substantially parallel to the conveyor axis C As shown in FIG. 2, each lateral urging assembly 23 attached to the flexible conveyor belt 22 includes a translator shoe 26, shoe carrier 24, air-driven motor 30, cog belt 34, drive sprocket 32 and idler sprocket 33.

Each translator shoe 26 is slidably mounted atop a shoe carrier 24 which is itself mounted to the belt 22. The shoe carrier 24 also acts as a containment shield for the cog belt 34.

The cog belt 34 is endless, and is supported by the drive sprocket 32 and the idler sprocket 33. The cog belt 34 is driven by the drive sprocket 32, which is itself driven by an air motor 30. The air motor 30 is reversible, and is controlled by an off-conveyor programmable logic controller (PLC) to provide the back and forth movement of the translator shoe.

As noted above, the air motors 30 are attached to the conveyor belt 22, and therefore each move along with the conveyor belt 22. As the conveyor belt 22 is in the preferred embodiment endless, it moves along an endless path. The present invention provide an intermittent, temporary supply of air power at certain "stations" along this endless path by the use of discharge stations 50 such as shown in FIGS. 1–7. Each of these discharge stations 50 supplies air to at least one of the air motors 30 as they pass by the discharge stations 50. This is done by providing air nozzles for movement along an endless path configured to engage suitable receptacles on the air motors, to provide the air motors with air as needed. The discharge stations each include a flexible endless tube 60 (which can be considered to as an "inner tube"), air nozzles 62 attached to the endless tube, a cog belt 63 attached to the endless tube, a tube drive motor 52 and associated drive elements, and associated air and electrical current supply elements.

Generally described, as shown in FIGS. 1–7, air supplied from an outside source is provided into the flexible tube 60 and passes from air nozzles 62 attached thereto into receptacles 31 on the air motors 30. Movement of the air motors 30 and the air nozzles 62 is synchronized. Air valving is discussed below further detail.

Referring now to FIGS. 2, 3, 6, and 7, the inflated endless tube 60 is rotated about a plurality of pulleys on a cog belt 62 that is attached to the inner side of the inflated endless tube 60.

Figures 6, 7:
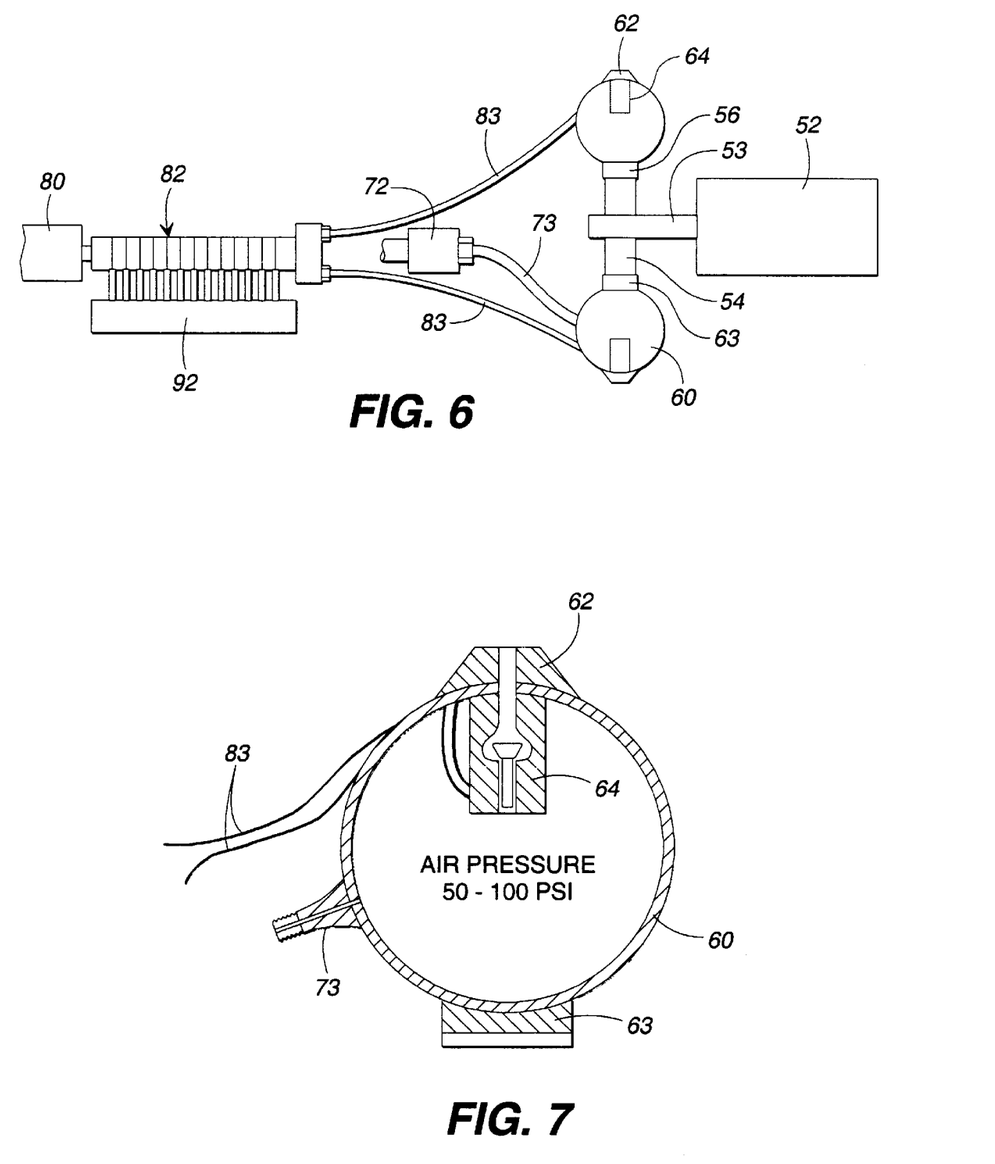
FIG. 6 is an isolated view of a multi-connection electrical commutator according to the present invention in use with the inflated endless tube according to the present invention.
FIG. 7 is a partial cross-sectional view of an inflated endless tube 60 according to the present invention, having a cog belt 63 attached thereto. A guide sheave 66 is also shown without a drive sprocket therein.

As shown especially well in FIG. 6, the cog belt 63 is driven by a drive motor 52 though means of a drive shaft 53 attached to a drive sprocket 54. The drive sprocket has edge guides to provide guidance to the endless tube 60. In the embodiment shown, the rotational axis of the drive shaft 52 and drive pulley 54 is substantially horizontal, below the plane of the conveyor, and substantially transverse to the travel axis C of the conveyor.

As shown in FIG. 2, air is supplied to the inflated endless tube 60 by a rotary coupling 72 which connects a rotating air line 73 with a substantially stationary air line 70 which supplies air from an air source (not shown) to the endless air-filled tube 60.

The flexible air line 73 must flex in the embodiment shown in FIG. 6, as one end attached to the rotary air connector 72 will be following a substantially circular route, while its opposite, "outer" end (attached to the inner tube) will be following a noncircular route. In the embodiment shown, the route will approximate a substantially oval path comprised of two straight lengths alternating with cofacing semicircular segments.

As shown in FIG. 7, a solenoid valve 64 is located inside the inflated endless tube 60 at each of the air jets and is electronically controlled to provide air from within the tube 60 to a given nozzle 62 as desired. The air pressure inside the inflated endless tube 60 is maintained at approximately 50–100 psi and is supplied via an external air valve, as seen in FIG. 7.

The solenoid valves 64 are electronically controlled by an electrical power controller which is, in turn, controlled by a programmable logic controller (not shown).

Figure 3:
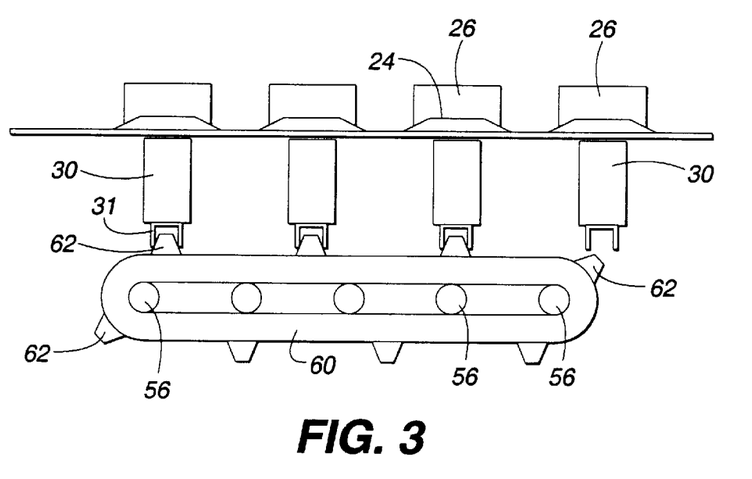
FIG. 3 is a side isolated view of a first discharge station 50 according the present invention, viewed from the side of the conveyor across the conveying axis.
Figure 4:
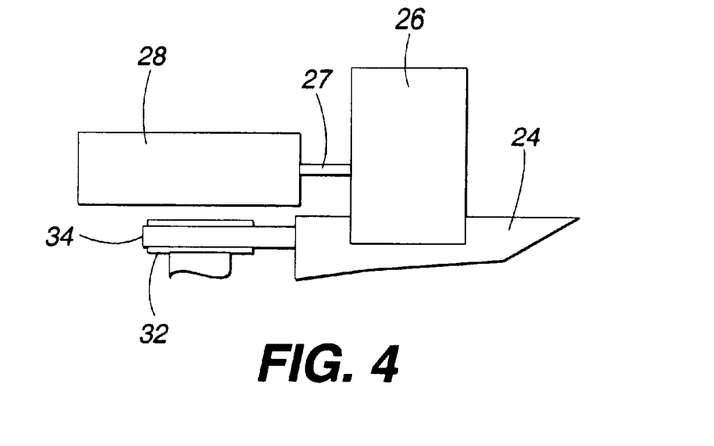
FIG. 4 is a detailed view of a portion of the package conveying portion, including a retractor 28.
Figure 5:
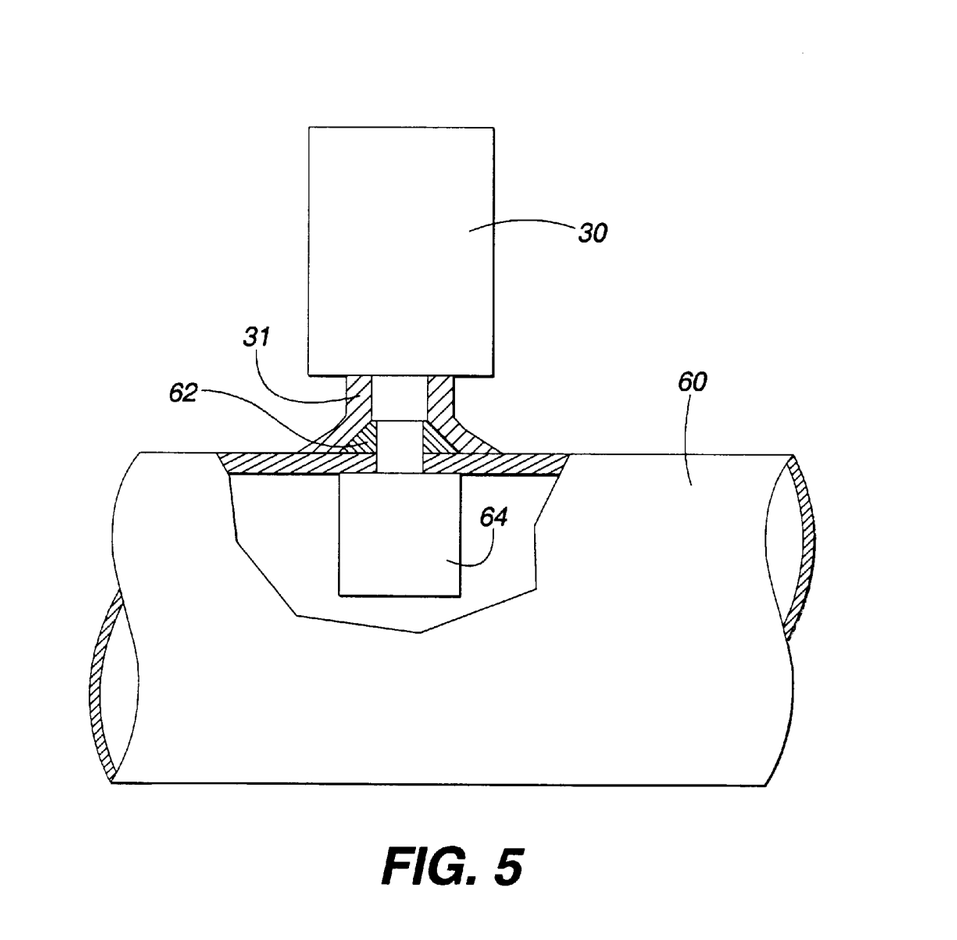
FIG. 5 is an isolated view of a floating detachable power connection between an air supply nozzle 62 and an air receptor 31 according to the present invention.

Operation of the first embodiment of the present invention is as follows. As the conveyor belt is energized, the inflated endless tube 60 assembly is likewise energized so that the conveyor belt and the inflated endless tube 60 travel in the same direction, at the same synchronized speed. While in motion, the air intake receptors of the air motors attached to each parcel ejection mechanism engage the air nozzles 62 in the inflated endless tube 60 at each discharge station as the air motors 30 travel by. With this configuration, the air motors 30 of the parcel ejection mechanisms will always engage the air distribution system when the parcel ejection mechanisms are laterally adjacent to a given discharge station, as seen in FIG. 1. Actuation of an air motor is feasible only when a particular air nozzle 62 engages the air receptacle 31 of the air motor and opens in response to a signal from the programmable logic controller, as shown in FIGS. 2 and 3. Air is thus released from the inflated endless tube 60 through the air nozzle, through the air receptacle, and to the air motor to actuate the motor and ultimately the parcel ejection mechanism as shown in FIG. 2. Retraction of the translator shoe 26 of the parcel ejection mechanism takes place after the programmable logic controller closes the air valve and allows the coil spring retractor to bring the translator shoe 26 back to its original position, as shown in FIG. 2.

Second Embodiment

Figure 8:
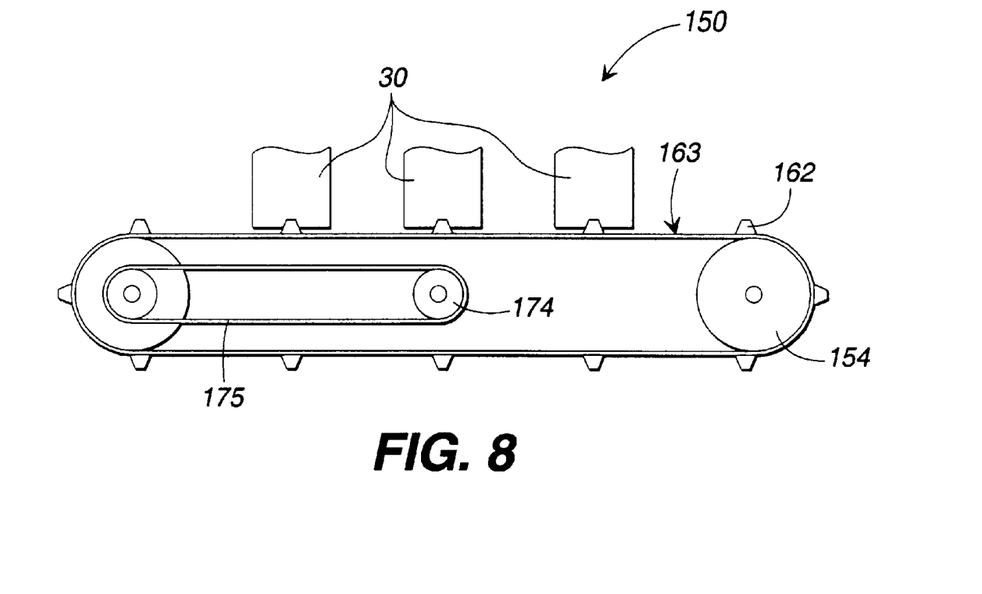
FIG. 8 is a side isolated view of a second discharge station 150 according to a second embodiment of the present invention, viewed perpendicular to and across the conveyor axis.
Figure 9:
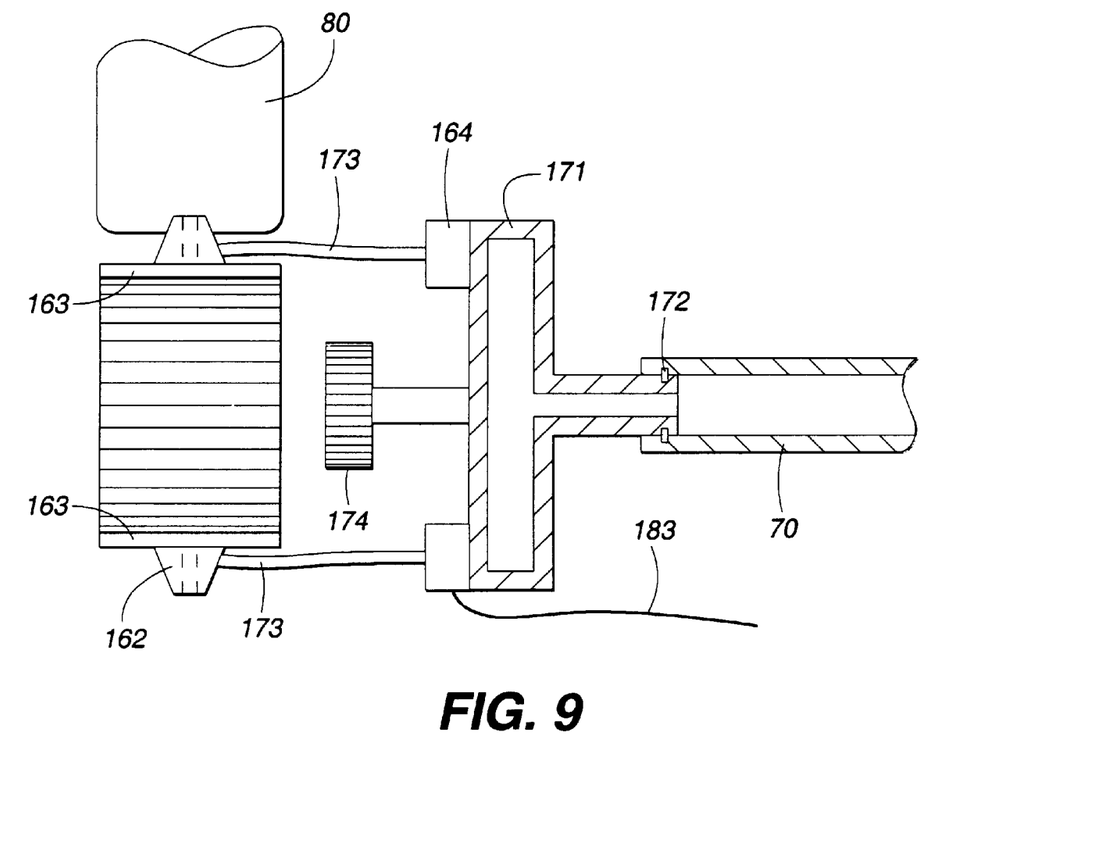
FIG. 9 is a side isolated partial cross-sectional view of the second discharge station 150 according to the present invention, viewed along the conveying axis of the conveyor, and showing a rotating air chamber in cross section.

FIGS. 8 and 9 illustrate a second embodiment of the present invention. In this embodiment, a plurality of air nozzles 162 are attached to a sprocket-driven cog belt 163. As shown in FIG. 8, the sprocket-driven belt 163 is disposed such that the air nozzles 162 will engage the air intake receptors attached to the air motors of each parcel ejection mechanism, in a manner similar to the engagement of the nozzles 62 discussed in conjunction with the first embodiment.

As shown in FIG. 9, air is supplied to the air nozzles 162 by a rotating air chamber 171 which is operatively connected to the air nozzles 162 by a plurality of flexible air lines 173. A rotary coupling 172 is provided which allows the rotating air chamber 171 to receive air from a fixed air supply line 170.

Within each flexible air line 173 is an electrically-controlled air valve 164, which is supplied with suitable current via corresponding electrical wires 183, and again controllable with a PLC.

The rotating air chamber 171 shown in FIG. 9 is rigidly attached relative to an air chamber drive sprocket 174. This sprocket 174 is driven as shown in FIG. 8 by a cog belt 175 which is also linked to a sprocket driving or driven by the cog belt 163. This allows for synchronization of the two belts 175, 163 and for their associated sprockets.

The flexible air lines 173 must flex in the embodiment shown in FIG. 9, as their ends attached to the rotating air chamber 171 will be following a substantially circular route, while their opposite ends (attached to the air nozzles 162) will be following a noncircular route. In the embodiment shown, the route will approximate a substantially oval path comprised of two straight lengths alternating with cofacing semicircular segments.

Figure 10:
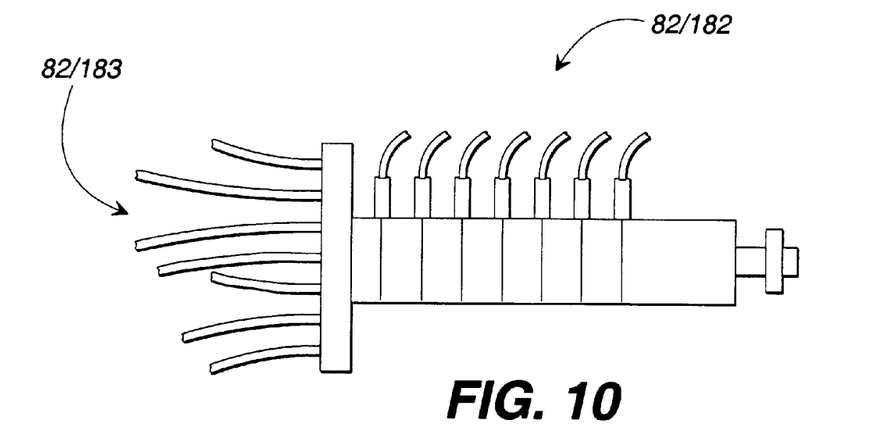
FIG. 10 is an isolated view of a multi-contact electrical commutator according to the present invention which can be used to provide electrical supply to any of the embodiments requiring electrical signals or power along an endless path.

Referring now to FIG. 10, a rotary commutator 82, 182 is provided to accommodate the rotation of the electrical wires 83, 183 of the corresponding two embodiments described above along with the rotating air cylinder 183. The electrical wires 183 are electrically connected to a commutator having a plurality of ring-shaped contacts, which are configured to slidingly contact stationary contacts which lead to a programmable logic controller (not shown).

The air distribution system of the second embodiment likewise travels with the overlying conveyor system such that the belt mounted air nozzles engage the air receptors of the air motors as the parcel ejection mechanisms travel by on the overlying conveyor system. Referring to FIG. 9, the air motor is actuated by a release of air from the rotating air chamber. The operation of the electric air valves again may be controlled by a programmable logic controller.

Third Embodiment

Figure 11:
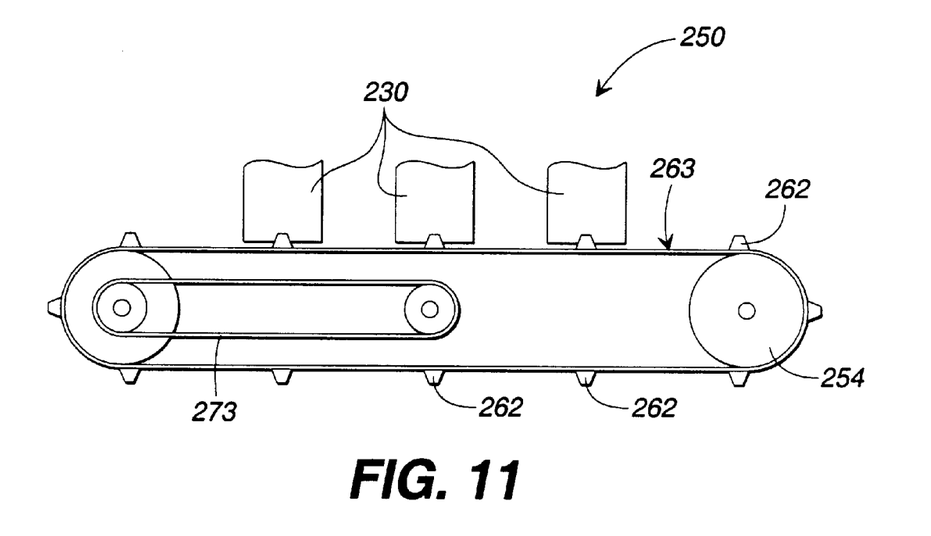
FIG. 11 is a side isolated view of a third discharge station according to a third embodiment of the present invention, viewed from the side of the conveyor.

In the third embodiment shown in FIG. 11, electric motors 230 may be used in place of air motors. In this case, power via electricity will be distributed to the electric motors in a manner similar to the second embodiment, described above, by mounting electrical contacts 262 onto a cog belt 263 rather than air nozzles. The electrical contacts will engage corresponding electrical contacts on the electric motors 230, similar to the engagement of the air nozzles with the air intake receptors of the air motors. An electrical commutator assembly similar to that shown in FIG. 10 can be used, except that the electrical wires will lead to the contacts 262 mounted to the belt 263 instead of to a valve.

Fourth Embodiment

Figure 12:
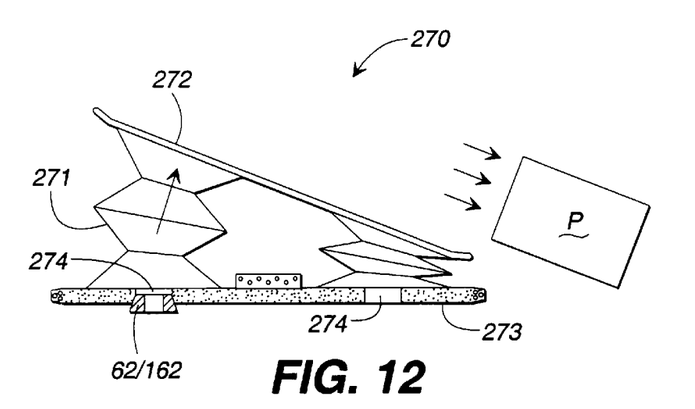
FIG. 12 is view of a vertical bellows configuration capable for use with a fourth embodiment of the present invention supplied with air from an air supply nozzle 62, 102.

Reference is now made to FIG. 12, which shows a lateral urging assembly taking the form of a vertical bellows configuration 270 including vertical air bellows members 271, a tiltable tray 272, and a conveyor belt 273. The tiltable tray such as 271 is supported by the vertical bellows members 272, which can be used such that a package "P" placed stop the tray 272 slides off at least partly under the influence of gravity upon tilting of the tray by the bellows. The conveyor belt 273 (which in one preferred embodiment is of conventional flexible conveyor belt material) defines bellows ports 274, which facilitate air passage therethrough to corresponding bellows 271 to cause their inflation as illustrated. Such a port 274 allows for air to pass therethrough, such that air blown through the port under a relatively low pressure facilitates inflation and expansion of its associated bellow member, causing the tray to be moved upwardly. Assuming that only one bellows is inflated, this causes the tray 272 to tilt, thus allowing for lateral sliding movement of a package from atop the tray off the conveyor at least partially under the influence of gravity.

It should be understood that the air supply nozzle 62, 162, shown in FIG. 12 can be such as that included as 62 in the first embodiment of the present invention which includes an endless air tube, or may be such as 162 in the second embodiment of the present invention which includes an endless belt supporting the air supply nozzles 162 thereon.

Fifth Embodiment

Figure 13:
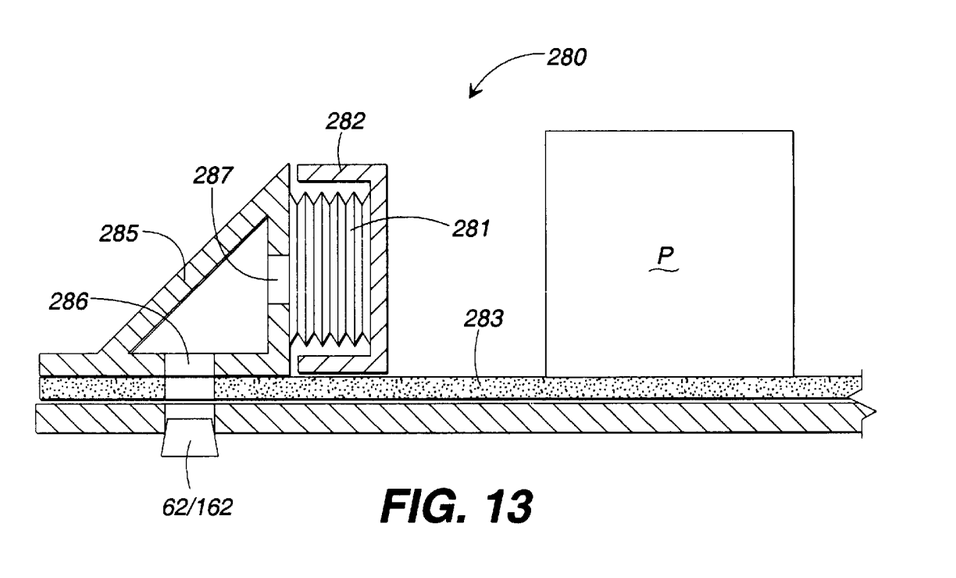
FIG. 13 is view of the horizontal bellows configuration capable for use with the present invention as a lateral urging assembly.

Another particular type of lateral urging assembly generally denoted as 280 in FIG. 13 can be a "push plate" conveying segment. In this embodiment, two or more horizontally-acting bellows members 281 are attached relative to the top surface of a conveyor belt 273, to provide a pushing function to a package situated atop the top surface of conveyor belt 273, such that it is pushed off the conveyor belt 273.

The configuration 280 includes a base 282 a chamber housing 285, bellows members 281, and a push plate 282. The air chamber housing 285 is attached to the upper surface of the conveyor belt 273. The air chamber housing 285 defines an interior air chamber which is supplied air through a chamber inlet port 286 and itself supplies air to one or more chamber outlet ports 287, depending on the number of bellows members used. Each of the chamber outlet ports 287 supplies air from the chamber to a corresponding horizontally-oriented bellows 281.

It should be understood that the air supply nozzle 62, 162, shown in FIG. 12 can be such as that included as 62 in the first embodiment of the present invention which includes an endless air tube, or may be such as 162 in the second embodiment of the present invention which includes an endless belt supporting the air supply nozzles 162 thereon.

It should be also noted that the invention contemplates the use of dual, side-by-side, horizontal bellows, which can be controlled by the PLC to allow for a single pusher member to be "angled', if desired, to facilitate angled discharge if so desired. This can be done by controlling the relative flow of air into the two adjacent bellows members.

Sixth Embodiment

Figure 14:
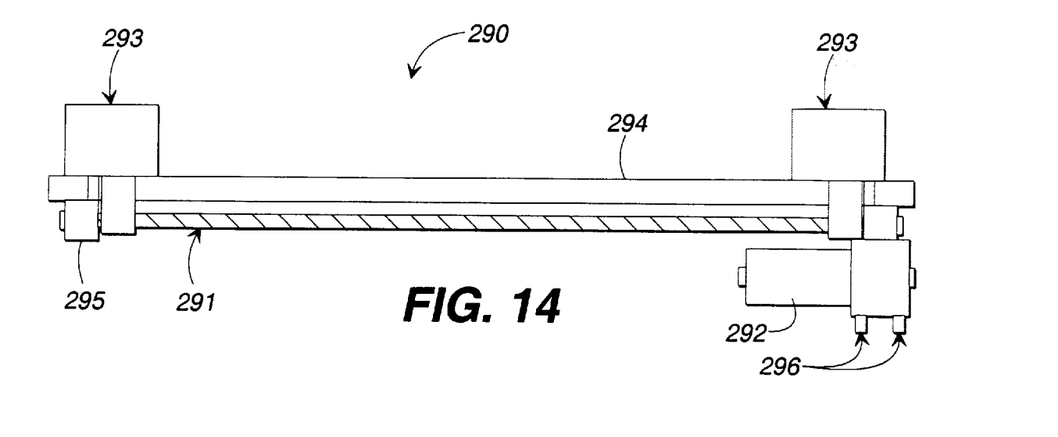
FIG. 14 shows a lead screw configuration 290 capable for use with the present invention as a lateral urging assembly.
Figure 15:
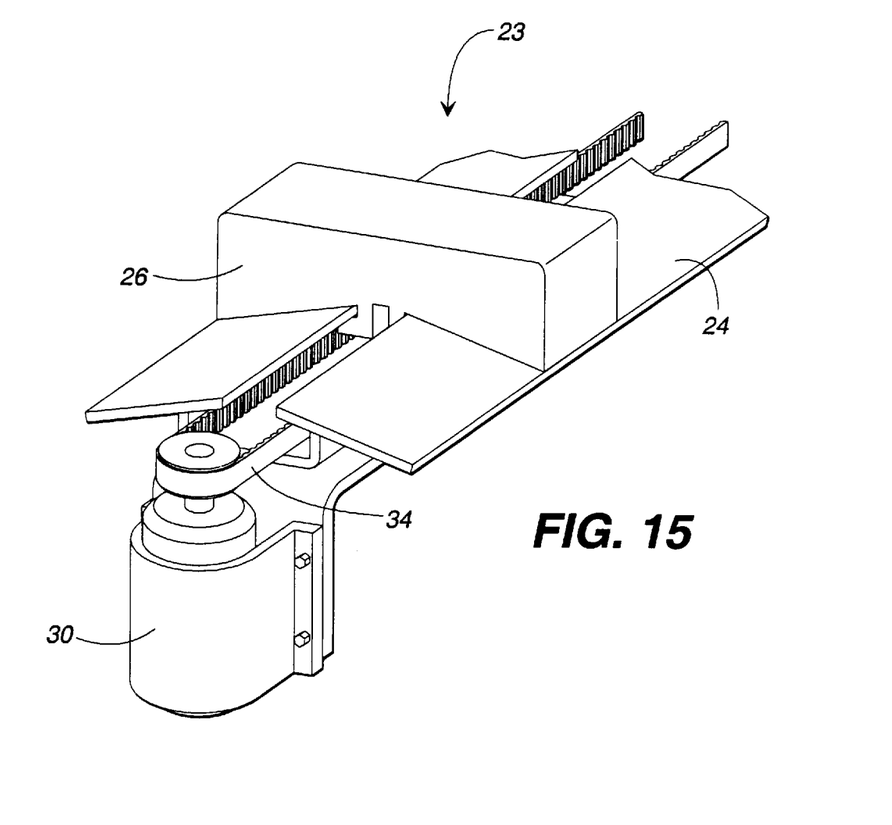
FIG. 15 shows another view, an isolated pictorial view, of the lateral urging assembly 23 translator shoe 26 atop the shoe carrier 24, which conceals the endless belt 34 driven by the air motor 30.

Still other lateral urging assemblies could be used. FIG. 14 shows a lateral urging assembly taking the form of a lead screw configuration 290. A lead screw 291 is powered by an electric gear motor 292, such that a translator shoe 293 can move across a slotted platform 294. One end of the rotatable lead screw is held and driven by the motor 292 and the other end is rotatable mounted relative to the platform 294 by a bearing 295. Electrical leads 296 are exposed which can be connected as described above to provide a "floating" power connection to the motor 292. The platform is connected to other rigid platforms by an intermediate flexible or pivotable connection (not shown), or can be mounted atop a flexible belt if so desired. An air motor could also be used.

Alternatives

As shown in FIG. 1, a discharge chute 14 is shown to accept packages as they exit the conveyor 20 sidewardly. However, it should also be understood that other means could be provided to accept said packages. For example, a second conveyor could be provided to accept and further convey the packages, or an stationary bin or sack could be used.

Conclusion

While this invention has been described in specific detail with reference to the disclosed embodiments, it will be understood that many variations and modifications may be effected within the spirit and scope of the invention as described in the appended claims.

What is claimed is:

1. A conveyor apparatus defining at least one package supporting surface for conveying a package placed thereon along a conveyor path and selectively urging said package laterally from said conveyor path with the aid of an off-conveyor power source, said apparatus comprising:

a stationary frame;

a package conveying portion movable relative to said frame for defining said supporting surface;

a lateral urging assembly including a first power interface member movable along a first path, said lateral urging subapparatus attached relative to said package conveying portion for moving therewith and for selectively urging said package laterally to said conveyor path upon the supply of power to said first power interface member;

a stationary power supply station including a second power interface member operably attached relative to said off-conveyor power source and movable along a second path, said second path positioned relative to said first path to allow said first and second power interface members to be both engaged and disengaged as they move along said respective paths; and means for synchronizing the movement of said first and second power interface members such that they can go from being disengaged to engaged to disengaged while said package conveying portion is moving relative to said frame, such that said lateral urging assembly can be selectively energized via power from said off-conveyor power source when said first and second power interface members are engaged.

2. The conveyor apparatus as claimed in claim 1, wherein said first and second power interface members travel along a linear path portion during engagement.

3. The conveyor apparatus as claimed in claim 2, wherein said linear path portion is a part of an endless path.

4. The conveyor apparatus as claimed in claim 3, wherein said second power interface member is attached to an endless belt.

5. The conveyor apparatus as claimed in claim 4, wherein said first and second power interface members provide an air power interface.

6. The conveyor apparatus as claimed in claim 4, wherein said first and second power interface members provide an electrical power interface.

7. The conveyor apparatus as claimed in claim 3, wherein said second power interface member is attached to an endless tube which supplies power through means of pressurized air.

8. The conveyor apparatus as claimed in claim 1, wherein said lateral urging assembly includes a translator shoe for contacting and pushing said package from said conveyor.

9. The conveyor apparatus as claimed in claim 8, wherein said translator shoe is attached to an endless belt also being part of said lateral urging assembly and translated therewith.

10. The conveyor apparatus as claimed in claim 8, wherein said translator shoe is threadably engaged relative to a lead screw also being part of said lateral urging assembly, and is laterally translated along the longitudinal axis of said lead screw upon the rotation of said lead screw.

11. The conveyor apparatus as claimed in claim 8, wherein said translator shoe is laterally driven by a horizontal bellows having its other end attached relative to said conveyor.

12. The conveyor apparatus as claimed in claim 8, wherein said lateral urging assembly includes a tilting tray tilted by a vertical bellows having its other end attached relative to said conveyor, such that expansion of said vertical bellows causes tilting of said tray sufficient to cause a package to slide laterally therefrom.

13. The conveyor apparatus as claimed in claim 1, further comprising control means such that power can be selectively provided through said first and second power interface members for a period less than the period of engagement of first and second power interface members.

14. A conveyor apparatus defining at least one package supporting surface for conveying a package placed thereon along a conveyor path and selectively urging said package laterally from said conveyor path with the aid of an off-conveyor power source, said apparatus comprising:

a stationary frame;

a package conveying portion movable relative to said frame for defining said supporting surface;

a lateral urging assembly including a first power interface member movable along a first path, said lateral urging subapparatus attached relative to said package conveying member for moving therewith and for selectively urging said package laterally to said conveyor path upon the supply of energy to said first power interface member;

a stationary power supply station including a flexible endless belt and a second power interface member operably attached to said flexible endless belt, said flexible endless belt movable such that said second power interface member is movable along a second path, said second path positioned relative to said first path to allow said first and second power interface members to be both engaged and disengaged as they move along said respective paths; and means for synchronizing the movement of said conveyor and said flexible endless belt such that said first and second power interface members go from being disengaged to engaged to disengaged while said package conveying portion is moving relative to said frame, such that said lateral urging assembly can be selectively energized via power from said off-conveyor power source when said first and second power interface members are engaged.

15. The conveyor apparatus as claimed in claim 14, further comprising an air supply line supplying air to said second power interface member, and further comprising an air motor being part of said lateral urging assembly, said air supply line supplying air to said second power interface such that air is passed to said first power interface and to said air-powered motor such that said air-powered motor can selectively urge said package laterally relative to said conveyor path.

16. The conveyor apparatus as claimed in claim 15, further comprising an electrically-operated solendoid valve for controlling air flow through said air supply line.

17. The conveyor apparatus as claimed in claim 14, further comprising an electrical current supply to said second power interface member, and further comprising an electric motor being part of said lateral urging assembly, such that electrical power is transferred through said power interface and to said motor such that said motor can selectively urge said package laterally relative to said conveyor path.

18. The conveyor apparatus as claimed in claim 14, wherein said lateral urging assembly includes a translator shoe for contacting and pushing said package from said conveyor.

19. The conveyor apparatus as claimed in claim 18, wherein said translator shoe is attached to an endless belt and translated therewith.

20. The conveyor apparatus as claimed in claim 18, wherein said translator shoe is threadably engaged relative to a lead screw also being part of said lateral urging assembly, and is laterally translated along the longitudinal axis of said lead screw upon the rotation of said lead screw.

21. The conveyor apparatus as claimed in claim 18, wherein said translator shoe is laterally driven by a horizontal bellows having its other end attached relative to said conveyor.

22. The conveyor apparatus as claimed in claim 18, wherein said lateral urging assembly includes a tilting tray tilted by a vertical bellows having its other end attached relative to said conveyor, such that expansion of said vertical bellows causes tilting of said tray sufficient to cause a package to slide laterally therefrom.

23. The conveyor apparatus as claimed in claim 14, wherein power can be selectively provided through said first and second power interface members for a period less than the period of engagement of first and second power interface members.

24. A conveyor apparatus defining at least one package supporting surface for conveying a package placed thereon along a conveyor path and selectively urging said package laterally from said conveyor path with the aid of an off-conveyor power source, said apparatus comprising:

a stationary frame;

a package conveying portion movable relative to said frame for defining said supporting surface;

a lateral urging assembly including a first power interface member movable along a first path, said lateral urging assembly attached relative to said package conveying member for moving therewith and for selectively urging said package laterally to said conveyor path upon the supply of energy to said first power interface member;

a stationary power supply station including a flexible endless tube and a second power interface member operably attached to said flexible endless tube to allow air flow therebetween, said flexible endless tube movable such that said second power interface member is movable along a second path, said second path positioned relative to said first path to allow said first and second power interface members to be both engaged and disengaged as they move along said respective paths; and means for synchronizing the movement of said conveyor and said flexible endless tube such that said first and second power interface members go from being disengaged to engaged to disengaged while said package conveying portion is moving relative to said frame, such that said lateral urging assembly can be selectively energized via power from said off-conveyor power source when said first and second power interface members are engaged.

25. The conveyor apparatus as claimed in claim 24, further comprising an air supply line supplying air to said second power interface member, and further comprising an air motor being part of said lateral urging assembly, said air supply line supplying air to said second power interface member such that air is passed to said first power interface member and to said air-powered motor such that said air-powered motor can selectively urge said package laterally to said conveyor path.

26. The conveyor apparatus as claimed in claim 25, further comprising an electrically-operated solendoid valve for controlling air flow through said air supply line.

27. The conveyor apparatus as claimed in claim 24, wherein said lateral urging assembly includes a translator shoe for contacting and pushing said package from said conveyor.

28. The conveyor apparatus as claimed in claim 27, wherein said translator shoe is attached to an endless belt and translated therewith.

29. The conveyor apparatus as claimed in claim 27, wherein said translator shoe is threadably engaged relative to a lead screw also being part of said lateral urging assembly, and is laterally translated along the longitudinal axis of said lead screw upon the rotation of said lead screw.

30. The conveyor apparatus as claimed in claim 27, wherein said translator shoe is laterally driven by a horizontal bellows having its other end attached relative to said conveyor.

31. The conveyor apparatus as claimed in claim 27, wherein said lateral urging assembly includes a tilting tray tilted by a vertical bellows having its other end attached relative to said conveyor, such that expansion of said vertical bellows causes tilting of said tray sufficient to cause a package to slide laterally therefrom.

32. The conveyor apparatus as claimed in claim 24, wherein power can be selectively provided through said first and second power interface members for a period less than the period of engagement of first and second power interface members.

\* \* \* \* \*